March 8, 1949.  J. T. WHITE  2,464,164
VEGETABLE AND FRUIT EYE REMOVER
Filed March 15, 1948
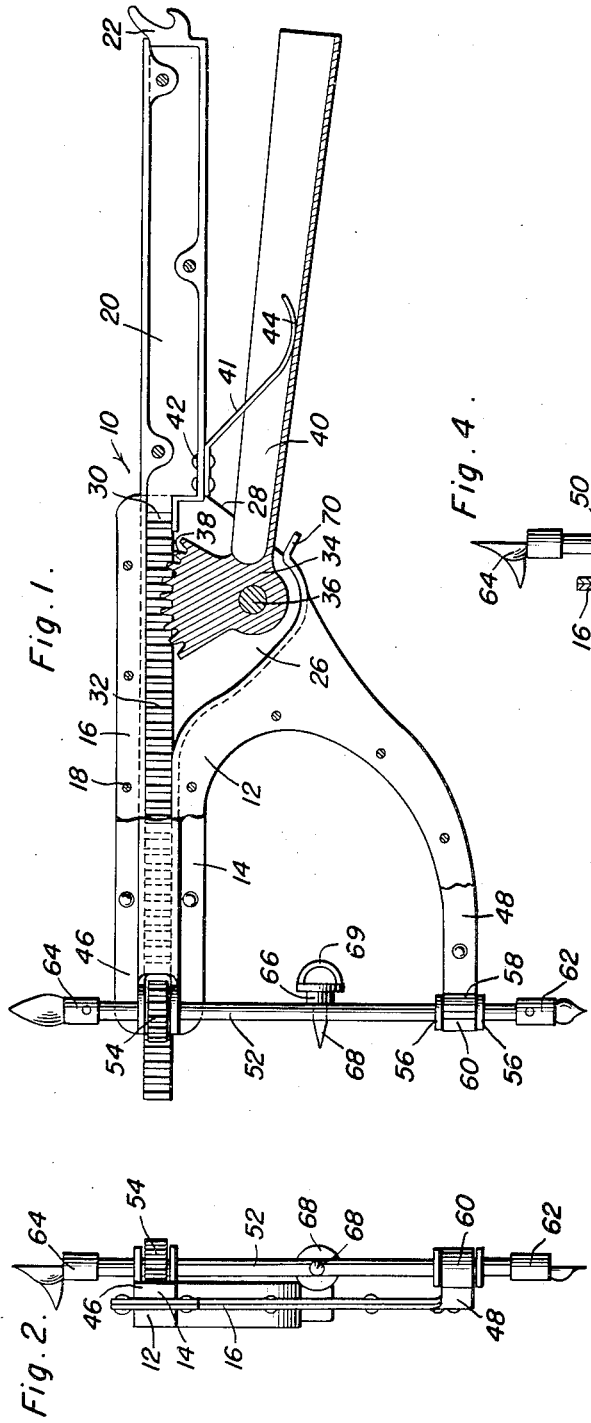
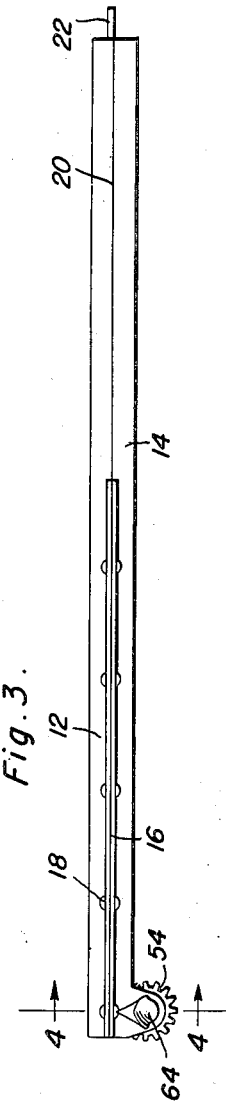
John T. White
INVENTOR.

Patented Mar. 8, 1949

2,464,164

UNITED STATES PATENT OFFICE 2,464,164

VEGETABLE AND FRUIT EYE REMOVER

John T. White, Palmyra, Mo., assignor of twenty per cent to John G. White, Ogden, Utah, twenty per cent to Everett A. White, Downers Grove, Ill., twenty per cent to Howard D. White, Chicago, Ill., and twenty per cent to Robert L. White, Palmyra, Mo.

Application March 15, 1948, Serial No. 14,965

5 Claims. (Cl. 146—203)

This invention comprises novel and useful improvements in vegetable and fruit eye removers and more specifically pertains to a kitchen utensil for cutting the eyes out of potatoes and the like.

The principal object of this invention resides in the provision of a kitchen utensil for easily and quickly removing the eyes from potatoes, vegetables and fruit. An important feature of the invention is the provision of an eye remover having a rotating shaft with cutter blades thereon, together with an improved operating means for rotating the shaft.

A further feature of the invention consists in providing a utensil as set forth in the preceding paragraphs, a reciprocating rack bar for rotating the shaft carrying the cutter blades, together with a segmental gear for reciprocating the rack bar.

And a final important feature of the invention to be specifically enumerated herein, resides in the provision of a utensil wherein the cutter blade shaft is mounted therein in a novel and improved manner, wherein the reciprocating rack is housed and guided within the body of the utensil, wherein there is provided a convenient means for manipulating the segmental gear and rack bar by one hand of the user, and wherein there is provided a light weight and inexpensive article, yet one which is highly satisfactory for the purpose intended.

These, together with various ancillary features and objects of the invention which will later become apparent as the following description proceeds, are attained by this device, a preferred embodiment of which has been illustrated by way of example only in the accompanying drawings, wherein;

Figure 1 is a side elevational view, parts being broken away along the central line of the invention;

Figure 2 is a front elevational view taken from the left of Figure 1;

Figure 3 is a top plan view of the invention shown in Figure 1; and,

Figure 4 is a fragmentary, vertical transverse sectional detail view taken substantially on the plane of the sectional line 4—4 of Figure 3 and showing the upper end of the cutter blade shaft and the gear for operating same.

Referring now more specifically to the accompanying drawings, wherein like numerals designate similar parts throughout the various views, the numeral 10 designates generally the entire utensil forming the subject matter of this invention, which as will be readily seen by reference to Figures 2 and 3, consists of a body joined along its central vertical longitudinal plane and comprises a pair of complemental casing members 12 and 14. Obviously, the body portion is formed of any suitable material, such as sheet metal or the like, and as shown, the body casing members are joined together by juxtaposed flanges 16 secured by rivets 18 or the like. Integrally formed upon the casing members 12 and 14 are rearward extensions constituting in their entirety a stationary or fixed handle member 20, which at its outer end is provided with a hooked portion 22 constituting a bottle opener for removing caps from bottles.

The casing member 12, as shown clearly in Figure 4, is laterally recessed to provide a U-shaped channel 24 constituting a guide channel which extends into a chamber 26 having an opening 28 at its rear end, for a purpose later to be set forth. Guidingly and slidably received in the channel 24 is a rack bar 30 having a plurality of teeth 32 extending throughout its length, which teeth constantly are engaged with an operating and a driven means as set forth hereinafter.

A segmental gear 34 of any suitable construction is journaled as at 36 within the chamber 26 of the casing members 12 and 14, and is provided upon its arcuate extremity with a plurality of teeth 38 which are continuously enmeshed with and operate the rack teeth 32 of the rack bar 30 for reciprocating the rack bar.

Extending integrally from the segmental gear 34, is a handle 40 which as shown is preferably U-shaped in cross section, and extends through the open end 28 of the casing 26, to underlie and terminate substantially adjacent the end of the fixed handle 20. A spring member such, for example, as the leaf spring 41, is securely supported upon the lower portion of the handle 20, and at its lower end is curved or flexed as at 44 for resilient abutment against the inner surface of the channel-shaped handle 40, for yieldingly urging the movable handle 40 away from the stationary handle 20, and by means of the engaging gear teeth 38 and 32, urging the rack 30 into its retracted position, shown in Figure 1, from whence it may be reciprocatingly extended by clamping the two handle members together against the resistance of the spring 41, thereby rotating the segmental gear 34.

As will be clearly apparent from Figure 1, the body portion of the utensil is provided with a bifurcated end forming upper and lower jaws or arms indicated at 46 and 48. As will be more clearly apparent from the detailed view of Figure 4, the casing member 14 is provided with laterally extending lugs 50, which are apertured for journaling therein a cutter blade shaft 52. This shaft has fixedly secured thereto a driven gear 54, received between the lugs 50, which gear continuously enmeshes with the teeth of the rack bar 30. It will thus be seen that when the rack bar is reciprocated, the shaft 52 will be rotated. Adjacent its lower end, the shaft 52, which extends across both of the arms 46 and 48, is provided with a pair of spaced integral annular collars 56 by means of which the shaft is positioned and held against longitudinal movement in the journal bearings in the lugs 50, and also in a journal portion 58 on the end of the lower arm 48, which journal portion is provided with a removable closure cap or bearing cap 60.

Upon its two extremities, the shaft 52 has removably secured but non-rotatably fixed thereon a pair of cutter blades 62 and 64 respectively. Each of these blades consists of a spoon-shaped member, having sharpened edges and tapered to a point at its outward extremity; the member 62 being shaped to penetrate a potato or the like adjacent the eye thereof, whereby when the shaft is rotated by the mechanism above described, the blade will cut around the eye and remove the same. The blade 64, is of a larger size, in order to peel, pare or further cut away the flesh of the potato adjacent the eye removed by the blade 62.

Intermediate its ends, the shaft 52 has a member 66 fixed thereto, this member having a point 68 and a handle 69. The point 68 constitutes a means for penetrating or opening the top of cans such as milk cans or the like, to provide an air vent or a discharge opening for the liquid contents of the can.

It is noted that adjacent the opening 28, the casing member 14 is provided with an outwardly extending lip 70 constituting an abutment for limiting the downward movement of the handle 40, when the device is in operative position.

From the foregoing, the manner of operating the device and its construction will be readily apparent as well as the advantages arising therefrom, and further explanation is believed to be unnecessary. However, since numerous modifications will readily occur to those skilled in the art after a consideration of the foregoing specification and attached drawings, it is not intended to limit the invention to the exact construction shown and described, but all suitable modifications and improvements may be resorted to falling within the scope of the appended claims.

Having thus disclosed and described the invention, what is claimed as new is as follows:

1. A vegetable and fruit eye remover comprising a rigid body having a bifurcated end, a shaft journaled transversely on the furcations of said body, cutter blades on the ends of said shaft, a gear on said shaft, a rack slidably guided for rectilinear reciprocation in said body and engaging said gear, a segmental gear journaled in said body for reciprocating said rack and an operating handle on said segmental gear.

2. The combination of claim 1, wherein said body consists of a pair of complementary casing members joined upon a plane, said rack being housed in one of said casing members.

3. The combination of claim 2, wherein said gear is journaled in the other casing member.

4. The combination of claim 3, wherein said segmental gear is housed in said other casing member.

5. The combination of claim 1, wherein said body has a stationary handle extending therefrom and a spring biasing said stationary and operating handles apart.

JOHN T. WHITE.

REFERENCES CITED

The following references are of record in the file of this patent:

UNITED STATES PATENTS

| Number | Name | Date |
| --- | --- | --- |
| 555,398 | Postley | Feb. 25, 1896 |
| 1,181,020 | Lapetina | Apr. 25, 1916 |
| 1,237,474 | Cilley | Aug. 21, 1917 |
| 1,480,398 | Kirchhoff | Jan. 8, 1924 |
| 1,994,366 | Mellor | Mar. 12, 1935 |
| 2,167,754 | Hill | Aug. 1, 1939 |